C. C. EARLE.
APPARATUS FOR PICKING COTTON FROM THE BOLL.
APPLICATION FILED MAY 20, 1910.
970,695.
Patented Sept. 20, 1910.
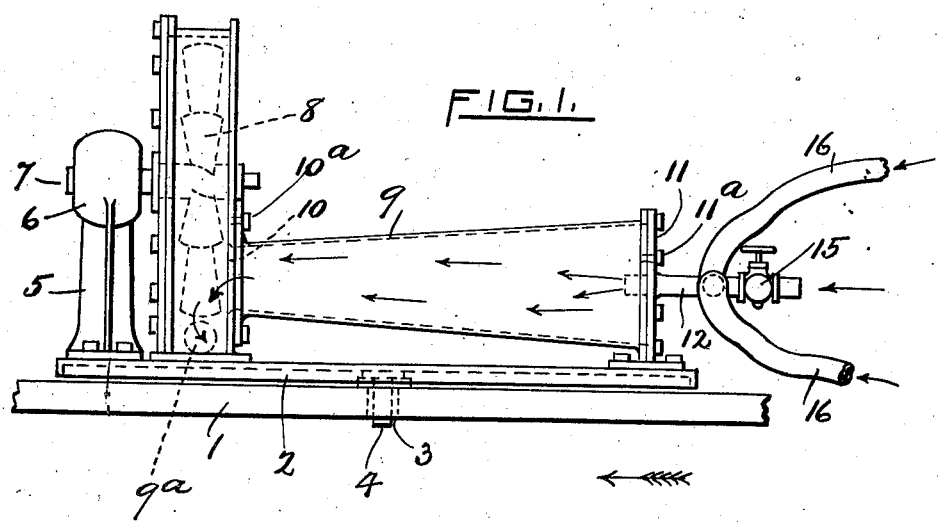
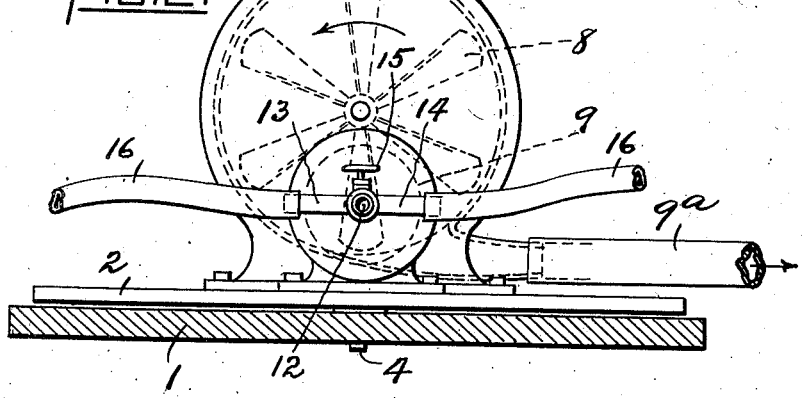
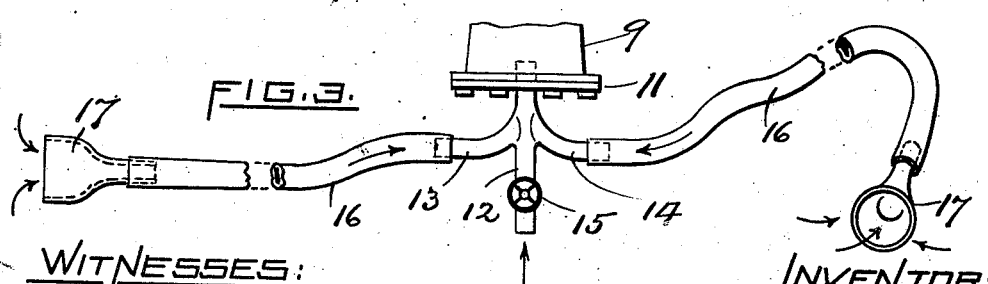
WITNESSES:
Jack P. Jennings
Philip E. Thomas
INVENTOR:
Courtland C. Earle.
By Charles P. Hannigan,
Attorney.

UNITED STATES PATENT OFFICE.

COURTLAND C. EARLE, OF PROVIDENCE, RHODE ISLAND.

APPARATUS FOR PICKING COTTON FROM THE BOLL.

970,695.

Specification of Letters Patent.  Patented Sept. 20, 1910.

Application filed May 20, 1910. Serial No. 562,380.

*To all whom it may concern:*

Be it known that I, COURTLAND C. EARLE, a citizen of the United States, residing at the city of Providence, in the county of Providence and State of Rhode Island, have invented certain new and useful Improvements in Apparatus for Picking Cotton from the Boll, of which the following is a specification.

This invention relates to cotton pickers and has for its object to provide a device of such class in a manner as hereinafter set forth for separating cotton from the boll and conveying the cotton to a suitable gathering receptacle for storage to ginning.

A further object of the invention is to provide a cotton picker in a manner as hereinafter set forth whereby the cotton is removed from the boll by suction which will permit of one or more laborers expeditiously picking the cotton without being subjected to the load of the cotton or to any other work other than holding a suction nozzle in proximity to a boll containing cotton or in proximity to a piece of cotton that adheres to the plant or has fallen upon the ground.

Further objects of the invention are to provide a cotton picker in a manner as hereinafter set forth and which shall be simple in its construction, strong, durable, efficient in its use, readily set up in operative position for the picking of the cotton, and inexpensive to manufacture.

With the foregoing and other objects in view, the invention consists of the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings wherein like reference characters denote corresponding parts throughout the several views: Figure 1 is a side elevation of a cotton picker in accordance with this invention. Fig. 2 is an end view looking in the direction of the arrow in Fig. 1, and, Fig. 3 is a plan of the inlet pipe connection and further showing a pair of picking tubes, each provided with a suction head.

Referring to the drawings in detail, 1 denotes a portable support upon which is mounted a base plate 2. The support 1 is formed with an opening 3 through which extends a stem 4 depending from the lower face of the base plate 2 whereby the latter is pivotally mounted upon the support 1.

Arranged at one end of the base plate 2 is an upright 5 provided at its upper end with a motor 6 of any suitable construction, the shaft of the motor 6 being indicated by the reference character 7 and projecting from the motor 6 and connected to a suction fan 8 which is supported upon the base plate 2 in proximity to the upright 5.

Extending at right angles with respect to the suction fan 8 is a frusto-conical member 9 which communicates through the opening 10 with the interior of the suction fan 8. The member constitutes an inlet for the fan 8 and is connected to the fan casing by the securing devices 10$^a$. The large end of the member 9 is closed by a plate 11 which is secured in position by the securing devices 11$^a$ and extending through this plate 11 is an inlet pipe 12, the latter being fixedly secured to the plate 11. The suction fan 8 is provided with an outlet pipe 9$^a$ which communicates with a suitable receptacle (not shown) for storing the cotton prior to the ginning of the latter. The air inlet pipe 12 is provided with a valve 15 for regulating the supply of air and said pipe 12 is furthermore provided with a pair of branches 13, 14 to each of which is attached a flexible picking tube 16 having its outer end provided with a suction head 17. The valve 15 is provided for regulating the air according to the degree of suction required to withdraw the cotton from its boll. The suction heads are of circular contour and of such diameter as to enable them to receive the largest growth of cotton. By pivotally mounting the base 2 upon the portable support 1, the base can be swung in any desired position during the operation of picking the cotton. The support 1 may form part of a wagon-body if desired.

From the construction described, it is obvious that the suction created by the fan 8 will remove the cotton from the boll and transfer it to the member 9, and then through the suction fan casing to the discharge pipe, from where it will be conducted to a suitable receptacle for containing the cotton prior to the ginning operation. The cotton on its travel will pass through the head 17 and through the tube 16 and thence into the inlet pipe and from there into the member 9. The passage of the air through the pipe 12 creates a vacuum in the tube 16 and operates in the same manner as an aspirator. From the member 9 the cotton passes in front of the fan 8 and is blown by the latter through the pipe 9ª to the receptacle designed to receive it. The member 9 being frusto-conical aids to prevent sediment from passing through the inlet 10, and whatever accumulation of sediment or residue of cotton that may confine itself within this member the latter can be readily cleaned of such by removal of the plate 11.

What I claim is:

1. In a cotton-picking apparatus, the combination with a portable support, a base-plate pivotally mounted on said support to swing about a substantially vertical axis, a power-driven suction device mounted on said base-plate and having an inlet and an outlet, a frusto-conical member communicating with the inlet, an air supply pipe opening into one end of said member, a plurality of suction tubes communicating with said pipe intermediate its ends, a suction head mounted on each tube and of a size to receive a cotton boll, and a valve carried by said pipe in proximity to its outer end for regulating the air according to the degree of suction required to withdraw the cotton from its boll.

2. In a cotton-picking apparatus, the combination with a portable support, a base-plate pivotally mounted on said support to swing about a substantially vertical axis, a suction device mounted on said base-plate and having an inlet and an outlet, power-driven means to operate said suction device, a horizontal frusto-conical member communicating with the inlet of said suction device and having its outer end closed, an air inlet pipe extending through the outer end of said member, a flexible tube communicating with said pipe, a cup-shaped nozzle secured on the free end of said tube and designed to receive the cotton boll, and a valve carried by said pipe to regulate the inflow of air through the latter.

3. In an apparatus of the character described, the combination with the portable support 1, of the base-plate 2 having a stem 4 to swing about a substantially vertical axis on said support, a casing mounted on said plate and provided with an inlet and an outlet, the fan 8 mounted within said casing, the motor 6 to drive said fan, the frusto-conical member 9 communicating with the inlet of said casing, the plate 11 closing the outer end of said cylinder and having a projecting air pipe 12 communicating with said frusto-conical member, the regulating valve 15 carried by said pipe, the flexible suction tubes 16, 16 communicating with said pipe, and a cup-shaped nozzle 17 secured on the free end of each tube.

In testimony whereof I affix my signature in presence of two witnesses.

COURTLAND C. EARLE.

Witnesses:
JIREH P. JENNINGS,
PHILIP E. THOMAS.